US010498155B2

(12) United States Patent
Varadarajan et al.

(10) Patent No.: US 10,498,155 B2
(45) Date of Patent: Dec. 3, 2019

(54) CONTROL SYSTEM FOR MAINTAINING PREFERRED BATTERY LEVELS IN A MICROGRID

(71) Applicant: SolarCity Corporation, San Mateo, CA (US)

(72) Inventors: Karthikeyan Varadarajan, Mountain View, CA (US); Ali Riazi, Palo Alto, CA (US)

(73) Assignee: SolarCity Corporation, San Mateo, CA (US)

( * ) Notice: Subject to any disclaimer, the term of this patent is extended or adjusted under 35 U.S.C. 154(b) by 700 days.

(21) Appl. No.: 15/084,388

(22) Filed: Mar. 29, 2016

(65) Prior Publication Data
US 2017/0288413 A1 Oct. 5, 2017

(51) Int. Cl.
H02J 5/00 (2016.01)
H02J 7/00 (2006.01)
H02J 3/32 (2006.01)
H02J 3/38 (2006.01)
H01M 10/44 (2006.01)
H01M 10/42 (2006.01)
F02D 19/02 (2006.01)
H02J 7/34 (2006.01)
H02J 7/35 (2006.01)

(52) U.S. Cl.
CPC .............. H02J 7/007 (2013.01); H02J 3/381 (2013.01); H02J 7/0052 (2013.01); H02J 7/0063 (2013.01); H02J 7/34 (2013.01); H02J 7/35 (2013.01); H02J 2007/0067 (2013.01)

(58) Field of Classification Search
CPC .......... H02J 7/007; H02J 3/381; H02J 7/0052; H02J 7/0063; H02J 7/34; H02J 7/35; H02J 2007/0067
USPC ...................................................... 307/11–42
See application file for complete search history.

(56) References Cited

U.S. PATENT DOCUMENTS

| 2016/0248263 | A1* | 8/2016 | Hunt | H02J 5/00 |
| 2016/0268802 | A1* | 9/2016 | Shim | H02J 3/24 |
| 2016/0359328 | A1* | 12/2016 | Hunt | H02J 3/32 |
| 2017/0117710 | A1* | 4/2017 | Viehweider | H02J 3/00 |
| 2017/0241353 | A1* | 8/2017 | Young | F02D 19/02 |
| 2017/0324246 | A1* | 11/2017 | Sato | H01M 10/44 |

* cited by examiner

Primary Examiner — Brandon S Cole
(74) Attorney, Agent, or Firm — Kilpatrick Townsend & Stockton LLP

(57) ABSTRACT

A system for controlling a battery state-of-energy within a microgrid includes an energy generation (EG) system, an electrical load coupled to the EG system, an energy storage system coupled to the EG system and the electrical load, and a controller coupled to the EG system and the energy storage system. The energy storage system can charge and discharge according to a target charge value and a target discharge value, which may be based on a state-of-energy of the energy storage system. The controller can control a power generation of the EG system based on the load demand and the target charge value and target discharge value of the energy storage system. The controller can further control a power generation of a second EG system when the EG system cannot meet the load demand and maintain the state-of-energy of the energy storage system within a desired level.

21 Claims, 11 Drawing Sheets

| State | Solar PV | Storage | Diesel Gen |
|-------|----------|---------|------------|
| 1 | ON | ON | OFF |
| 2 | ON | ON | ON |
| 3 | OFF | OFF | ON |
| 4 | ON | OFF | ON |
| 5 | OFF | ON | OFF |
| 6 | OFF | ON | ON |
| 7 | ON | OFF | OFF |
| 8 | OFF | OFF | OFF |

*FIG. 5*

| State-of-Energy | $P_{CHARGE-OPT}$ | $P_{DISCHARGE-OPT}$ |
|-----------------|------------------|---------------------|
| L5 – TOO HIGH | $-(\min [P_L, P_{DISCHARGE}])$ | $P_{DISCHARGE}$ |
| L4 – HIGH | 0 | $P_{DISCHARGE}$ |
| L3 – NORMAL | $P_{CHARGE}$ | $P_{DISCHARGE}$ |
| L2 – LOW | $P_{CHARGE}$ | 0 |
| L1 – TOO LOW | $P_{CHARGE}$ | $-k$ |

*FIG. 6*

CONTROL SYSTEM FOR MAINTAINING PREFERRED BATTERY LEVELS IN A MICROGRID

BACKGROUND

Microgrids are localized power grids that can disconnect from a traditional grid (e.g., public utility or "main grid") to operate autonomously, help mitigate grid disturbances, and strengthen grid resilience because they are able to continue operating while the main grid is down. Microgrids can further function as a grid resource for faster system response and recovery. Some microgrids can operate independently (i.e., off-grid) for more remote areas that lack access to public utilities.

Microgrids also support a flexible and efficient electric grid, by enabling the integration of growing deployments of renewable sources of energy such as solar and wind and distributed energy resources such as combined heat and power, energy storage, and demand response. The use of local sources of energy to serve local loads can help reduce energy losses in transmission and distribution, further increasing efficiency of the electric delivery system. Despite these advantages, microgrids may utilize certain resources (e.g., generator sets or "gen sets") that can be extremely sensitive to grid fluctuations and undesirable conditions such as over voltage, over frequency, or other forms of grid instability, which may result in extensive damage to the microgrid, and in some cases blackout (i.e., system shutdown). Better solutions are needed to create more robust microgrid systems to better accommodate fault conditions.

BRIEF SUMMARY

In certain embodiments, a system for controlling a battery state-of-energy within a microgrid includes an energy generation (EG) system, an electrical load coupled to the EG system, an energy storage system coupled to the EG system and the electrical load, and a controller coupled to the EG system and the energy storage system. The energy storage system can charge and discharge according to a target charge value and a target discharge value, which may be based on a state-of-energy of the energy storage system. In some implementations, the controller can control a power generation of the EG system based on the load demand and the target charge value and target discharge value of the energy storage system. The controller can further control a power generation of a second EG system when the EG system cannot meet the load demand and maintain the state-of-energy of the energy storage system within a desired level. The EG system can be a photo-voltaic-based EG system, and the second EG system can be a diesel gen set system. In some embodiments, the energy storage system operates in one of a plurality of functional states based on the state-of-energy of the energy storage system, where each functional state can be assigned a target charge value and a target discharge value to maintain or return the state-of-energy of the energy storage system to a target range of values.

In some cases, the charging and discharging of the energy storage system, as defined by the charge value and discharge value of the current functional state of the energy storage system, can be used to subsequently control the power generation of the EG system. When the energy storage system is at or near a maximum state-of-energy, the corresponding functional state may cause the EG system to stop charging the energy storage system and the energy storage system to solely provision the electrical load. In certain embodiments, the controller can further control a power generation of the second EG system when the EG system cannot meet the load demand and maintain the state-of-energy of the energy storage system within the desired level. When the energy storage system is at or near a minimum state-of-energy, the corresponding functional state can cause the energy storage system to stop provisioning the electrical load, and the second EG system can remain on to both meet the load demand and charge the energy storage system until a functional state with a higher corresponding state-of-energy is achieved. In some cases, at least one functional state of the plurality of functional states can include a hysteresis band level defining a reduced range of a state-of-energy for the at least one functional state for transitions from an adjacent functional state to the at least one functional state.

In certain embodiments, a system for controlling a battery state-of-energy within a micro-grid, the system includes an energy generation (EG) system, a battery system coupled to the EG system, the battery system having a state-of-energy, and a controller coupled to the EG system and the battery system. The controller can be configured to monitor a state-of-energy of the battery system, set a target charge value and a target discharge value based on the state-of-energy, and control the power generation of the EG system to meet a load demand on the system and attempt to control charging and discharging of the battery system within the target charge value and the target discharge value to adjust the state-of-energy to a desired range. Some embodiments may further include a second EG system, where the controller is further adapted to control a power generation of the second EG system when the EG system cannot meet the load demand and maintain the state-of-energy of the battery system within the desired range.

In some implementations, the target charge value and the target discharge value can be set based on the state-of-energy being within one of a plurality of band levels. The EG system can be a photo-voltaic-based EG system, and the second EG system can be a diesel gen set system. In some cases, when the battery system is at or near a maximum state-of-energy, the corresponding functional state causes the EG system to stop charging the battery system and the battery system to solely provision the electrical load. Some embodiments can further include a second EG system, where the controller further controls a power generation of the second EG system when the EG system cannot meet the load demand and maintain the state-of-energy of the battery system within the desired level. When the battery system is at or near a minimum state-of-energy, the corresponding functional state may cause the battery system to stop provisioning the electrical load, and the second EG system to remain on to both meet the load demand and charge the battery system until a functional state with a higher corresponding state-of-energy is achieved. The battery system may operate in one of a plurality of functional states based on the state-of-energy of the battery system, where each functional state is assigned a charge value and discharge value to return the state-of-energy of the battery system to a target value. In some cases, the charging and discharging of the battery system, as defined by the target charge value and target discharge value of the current functional state of the battery system, can be used to subsequently control the power generation of the EG system.

In some embodiments, a method includes receiving, by a processor, state-of-energy data from a battery system coupled to an energy generation (EG) system and an electrical load, determining, by the processor, which operational state of a plurality of operational states the battery system is operating in based on the state-of-energy data, determining, by the processor, a preferred target charge value and target discharge value of the functional state, and controlling, by the processor, a power generation of the EG system based on a load demand of the electrical load and the preferred charge and discharge values. Some embodiments can further include controlling, by the processor, a power generation of a second EG system based on the load demand of the electrical load and the state-of-energy data of the battery system, where the second EG system is coupled to the battery system and the electrical load. In such embodiments, the EG system can be a photovoltaic-based energy generation system, and the second EG system can be a diesel gen set system. In some implementations, the charging and discharging of the battery system, as defined by the charge value and discharge value of the determined functional state of the battery system, can be used to subsequently control the power generation of the EG system.

BRIEF DESCRIPTION OF THE DRAWINGS

The detailed description is set forth with reference to the accompanying figures.

FIG. 5 shows a state table for an energy storage system in a microgrid system, according to certain embodiments.

FIG. 6 shows a state table for an energy storage system in a microgrid system, according to certain embodiments.

DETAILED DESCRIPTION

Figure 1:
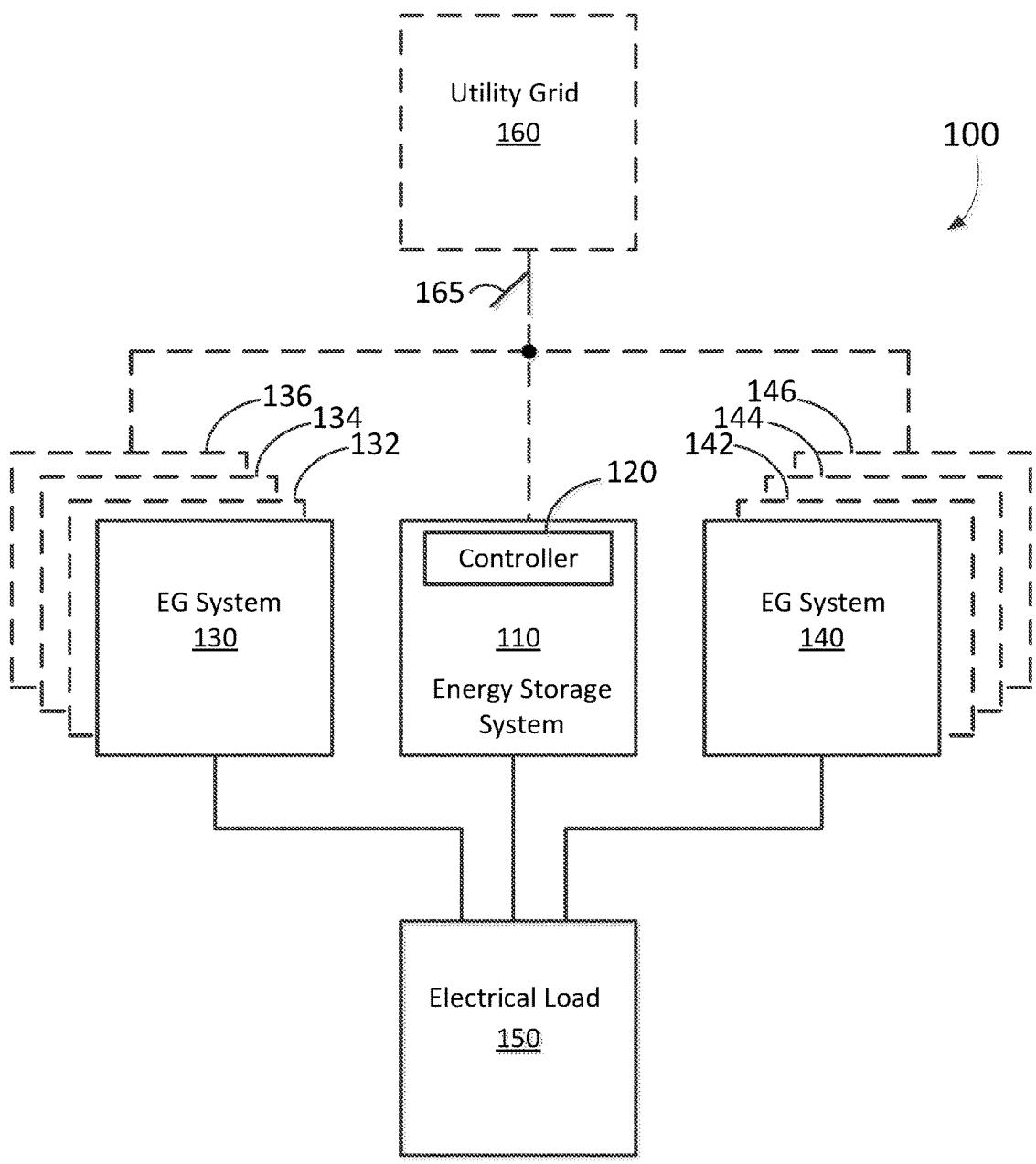
FIG. 1 shows a microgrid system, according to certain embodiments.

The present disclosure relates in general to microgrid systems, and in particular to maintaining operational parameters of an energy storage system in a multi-asset microgrid system.

In the following description, various embodiments of microgrid systems will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain embodiments, a microgrid system includes one or more energy generation (EG) systems, an electrical load (e.g., aggregate load), one or more energy storage devices (e.g., one or more batteries) to store excess energy generation from the EG system(s) and provision the load (e.g., discharge) when generation resources such as PV systems are unable to produce enough power to fully satisfy the load requirements. The energy storage device(s) operates in a number of different states, with each state having a determined charge value and discharge value corresponding to the SoE of the energy storage device. The microgrid system further includes a controller to monitor and control the charging and discharging of the energy storage system based on its corresponding operational state and SoE. The controller then controls power generation of the EG systems based on the load demand and the operational state (i.e., charge/discharge values) of the energy storage device. That is, the controller functions as a "microgrid operator," such that the energy generation assets (e.g., EG systems) operate in response to the current operational state of the energy storage system. The EG systems can then provision the load, recharge the energy storage device, or cease energy generation or shutdown accordingly. It should be noted that "operational state" and "functional state" can be used interchangeably for the purposes of describing the operation of the various embodiments herein.

Such systems are advantageous and immediately responsive to problems such as power fluctuations and rapid load changes, which can damage microgrid systems due to power system stability problems such as under/over-voltage and under/over-frequency events. In some cases, attempting to adjust the power generation of the one or more EG systems to accommodate the power fluctuations may take seconds, which can be too long as power system stability problems can damage elements of or even the entire microgrid system in a much shorter span of time (e.g., 100-500 ms). Embodiments using an energy storage system, like one or more batteries, with determined operating states and corresponding charge and discharge values can maintain the necessary capacity to respond much more quickly to such conditions (e.g., 20-30 ms) by autonomously absorbing or providing power as needed (metaphorically, like a shock absorber) in order to prevent power system stability problems such as under/over-voltage and under/over-frequency events as the EG systems adapt to the new conditions to make for highly robust, fast-acting, and adaptive microgrid systems.

It should be noted that the charge status of the energy storage devices (e.g., energy storage system 110) described herein is generally referred to as a state-of-energy, rather than a state-of-charge, although some embodiments may be described this way. Describing a storage capacity of an energy storage system in terms of state-of-charge may change over time due to the naturally occurring degradation in storage properties typically associated with long term use of batteries, as would be appreciated by one of ordinary skill in the art. For instance, a new battery may have a maximum storage capacity of 4.5 MWh. After 10 years, the maximum storage capacity may be reduced to 2.5 MWh. Thus, a 10% charge changes from 0.45 MWh to 0.25 MWh over the course of a decade. Thus, using the state-of-energy of a storage device to describe its current capacity is generally preferable.

FIG. 1 shows a microgrid system 100, according to certain embodiments. Microgrid system 100 includes an energy storage system 110, EG system(s) 130, EG system(s) 140, electrical load 150, and, optionally, utility grid 160. Energy storage system 110 includes controller 120. Controller 120 can be local to energy storage (ES) system 110 (as shown), or remotely coupled thereto via any suitable communication protocol (e.g., internet, RF wireless protocols, hardwire, etc.).

ES system 110 can include any suitable rechargeable storage device including, but not limited to, lithium-ion batteries, nickel-iron (NiFe) batteries, nickel-cadmium (Ni-Cad) batteries, lead-acid batteries, and the like. ES system 110 can include a single storage device or multiple storage devices configured locally or remotely from each other. ES system 110 can be in electrical communication with EG system(s) 130-136, EG system(s) 140-146, utility grid 160, and electrical load 150. In operation, ES system 110 may charge and discharge according to its state-of-energy. For instance, ES system 110 may charge by receiving power from EG systems 130, 140 or utility grid 160, and may discharge to (i.e., provision) electrical load 150. ES system 110 may be controlled by control 120. The terms "energy storage systems," "energy storage devices," "battery storage device," and the like, may be used interchangeably for the purposes of explaining the operation of the various embodiments described herein.

Controller 120 can prevent the excess or shortage of energy due to load fluctuations and intermittent energy generation in EG systems. In some embodiments, controller 120 may control the operation of ES system 110, EG system(s) 130-136, and EG system(s) 140-146, according to certain embodiments. Controller 120 can include one or more microprocessors (μCs), digital signal processors (DSPs), microcontrollers (MCUs), etc., with supporting hardware, software, and/or firmware (e.g., memory, programmable I/Os, etc.), as would be appreciated by one of ordinary skill in the art. In some embodiments, controller 120 may work in tandem with other controllers (not shown) to control EG systems 130-136, 140-146. In some aspects, controller 120 may be remote from energy storage system 120 and merely communicatively connected to other aspects of system 100 through a wired and/or wireless network.

In some embodiments, controller 120 calculates preferred charge and discharge values for energy storage system 110. Controller 120 then controls power generation of EG systems 130, 140 based on the load demand and the operational state (i.e., preferred charge/discharge values) of the energy storage device. The EG systems can then provision the load, recharge the energy storage device, or cease energy generation or shutdown accordingly.

In certain embodiments, EG system 130 can be any suitable renewable energy generation system including photo-voltaic (PV) generation systems, wind power systems, geo-thermal systems, hydro generation systems, or the like. In some cases, multiple EG systems may be used. For example, EG system 130 may include additional EG systems 132, 134, 136, which may be individually controlled, or could be subsystems of a main EG system, as would be understood by one of ordinary skill in the art. EG systems 132, 134, 136 may or may not be a similar class of energy generation system (e.g. PV systems, wind power systems, etc.). For the sake of simplifying the inventive concepts herein, EG system 130 will be described as a single PV-based energy generation system.

In certain embodiments, EG system 140 can be any suitable energy generation system including diesel gen sets, or other fossil fuel based power source. In some cases, multiple EG systems may be used. For example, EG system 140 may include additional EG systems 142, 144, 146, which may be individually controlled, or could be subsystems of a main EG systems, as would be understood by one of ordinary skill in the art. EG systems 142, 144, 146 may or may not be a similar class of energy generation system. For the sake of simplifying the inventive concepts herein, EG system 140 will be described as a single diesel gen system set.

Electrical load 150 can include any suitable load including residential loads, commercial site loads, industrial loads, or combinations thereof, as would be appreciated by one of ordinary skill in the art. Electrical loads may require active power and/or reactive power due to partially inductive or capacitive loads. Electrical load 150 can be a single load, multiple loads (i.e., aggregate load), loads of different types (e.g., active and reactive loads), and the like.

Utility grid 160 may include a local public utility to provide reliable power to energy storage system 110 and electrical load 150. Some embodiments may or may not include utility grid 160. In some aspects, utility grid 160 can be connected or disconnected from microgrid 100 via breaker 165 or equivalent switching mechanism. For the sake of simplifying the inventive concepts herein, utility grids 160 are not included in the embodiments that follow.

Figure 2:
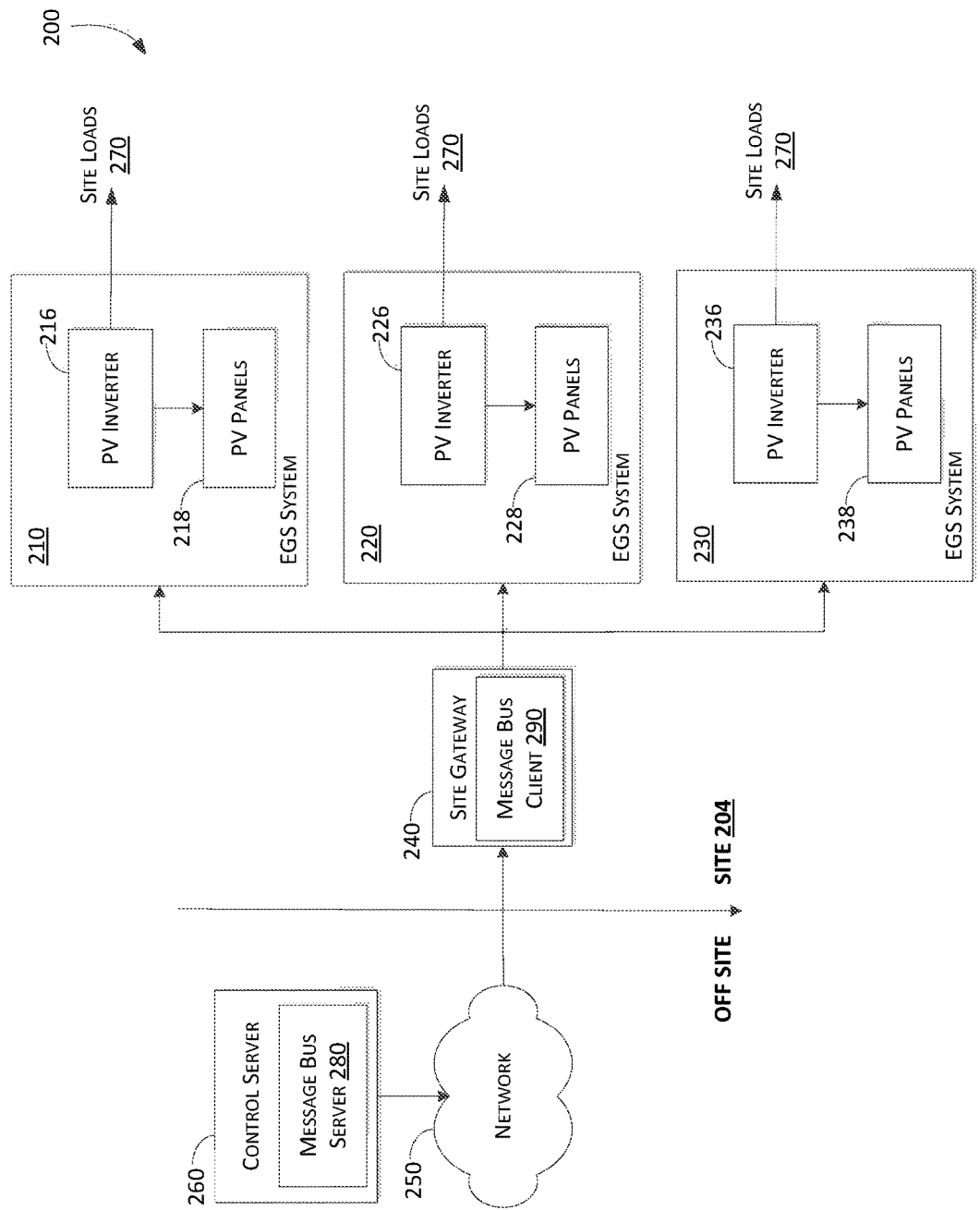
FIG. 2 shows a simplified block diagram of system environment for a multiple PV-based energy generation sites, according to certain embodiments.

FIG. 2 shows a simplified block diagram of PV system environment 200 for a PV-based energy generation site, according to certain embodiments. In some cases, aspects of PV system environment 200 may correspond to EG systems 130, 132, and 134 of FIG. 1. System environment 200 can include energy generation (EGS) systems 210, 220, 230. EGS systems 210-230 can include a PV-based EG subsystem that can include one or more PV inverters (216, 226, 236), and one or more PV panels (218, 228, 238). Some implementations can include a battery-based EG subsystem including a battery inverter/charger and battery device (not shown). In such cases, the PV inverter(s) and battery inverter/charger(s) can be combined into a single device. In some embodiments, EGS system 210, 220, 230 may be grid-connected; thus, e.g., PV inverter 216 may be electrically connected to a utility grid (e.g., utility grid 160). In certain embodiments, system environment 200 may operate in "island mode" with no connection to a local utility (e.g., utility grid 160), like system 100 of FIG. 1. EGS system 210-230 may be controlled by control server 260, or by other external control devices, such as controller 120 of FIG. 1, or by combinations of local and remote processing. In some cases, site loads 220 may correspond to electrical load 150.

Centralized or remote management of an EGS system, such as system 200, can be advantageous for large scale EG networks for residential, commercial, or industrial markets. In some aspects, both the ES and the EGS systems may be incorporated with a centralized management system. System 200, for example, can incorporate a centralized management system that includes site gateway 240 and control server 260. Site gateway 240 is a computing device (e.g., a general purpose personal computer, a dedicated device, etc.) that is installed at site 204. Gateway 240 may be a single gateway or a network of gateways and may be configured physically at the installation site or remotely, but in communication with system 200. As shown, site gateway 240 is communicatively coupled with on-site systems 210-230 and the components thereof, as well as with control server 260 via network 250. In some embodiments, site gateway 240 can be a standalone device that is separate from EGS systems 210-230. In other embodiments, site gateway 240 can be embedded or integrated into one or more components of systems 210-230. In some embodiments, the site gateway will be integrated with the Controller 120. Control server 260 is a server computer (or a cluster/farm of server computers) that is typically, but not necessarily, remote from site 204.

In one embodiment, site gateway 240 and control server 260 can carry out various tasks for monitoring the performance of EGS systems 210-230. For example, site gateway 240 can collect system operating statistics, such as the amount of PV energy produced (e.g., via PV inverter 216), the energy flow to and from a utility grid (for non-island mode microgrids), the amount of energy stored in local battery devices (not shown), and so on. Site gateway 240 can then send this data to control server 260 for long-term logging and system performance analysis. In certain embodiments, site gateway 240 may further be coupled to a controller 120 of FIG. 1. Site gateway 240 and control server 260 can operate in tandem to actively facilitate the deployment and control of EGS systems 210-230.

According to embodiments, communication between the various elements involved in power management (e.g., between the centralized control server and the various devices at the remote site, and/or between centralized control server 260 and various other remote devices such as a database server, web server, etc.) may be achieved through use of a power management Message Bus System (MBS), such as that described in application Ser. No. 14/527,553, assigned to SolarCity Corporation, and incorporated herein by reference in its entirety for all purposes. In the simplified view of FIG. 2, the MBS is implemented utilizing message bus server 280, and message bus client 290 located at site gateway 240. In FIG. 2, message bus server 280 is shown as being on control server 260, but this is not required and in some embodiments the message bus server could be on a separate machine and/or part of a separate server cluster. In some embodiments there could be multiple message bus servers. There could be one on site 204 that provides message bus service for local devices, and one off site.

The power management MBS as described herein, facilitates communication between the various entities (e.g., on-site devices, central control systems, distributed control systems, user interface systems, logging systems, third party systems etc.) in a distributed energy generation and/or storage deployment. In an aspect, the MBS operates according to a subscribe/publish model, with each respective device functioning as a subscriber and/or publisher, utilizing a topic of a message being communicated.

It should be appreciated that system environment 200 is illustrative and not intended to limit embodiments disclosed herein. For instance, FIG. 2 shows control server 260 (which may be controller 120) as being connected with multiple EGS systems at a single site, control server 260 can be simultaneously connected with a fleet of EGS systems that are distributed at multiple sites. In these embodiments, control server 260 can coordinate the scheduling of these various systems/sites to meet specific goals or objectives. In further embodiments, the various components depicted in system 200 can have other capabilities or include other subcomponents that are not specifically described. Furthermore, multiple instances and variants of the control server may exist, each communicating with one or more other control servers, EGS systems and/or other devices connected to the MBS. Alternatively, other methods of communication (e.g., point-to-point) other than MBS-based systems can be used, and one of ordinary skill in the art will recognize the many variations, modifications, and alternatives in methods of communication to implement system 200.

A diesel generator (e.g., EG system 140) can be a combination of a diesel engine with an electric generator (e.g., alternator) to generate electrical energy. A diesel compression-ignition engine often is designed to run on fuel oil, but some types are adapted for other liquid fuels or natural gas. Diesel gen sets are typically used in places without connection to a power grid, or as emergency power-supply if the grid fails, as well as for more complex applications such as peak-lopping, grid support and export to a power grid. The packaged combination of a diesel engine, a generator and various ancillary devices (such as base, canopy, sound attenuation, control systems, circuit breakers, jacket water heaters and starting system) can be referred to as a "generating set" or a "gen set" for short.

Set sizes range from 8 to 30 kW (also 8 to 30 kVA single phase) for homes, small shops and offices with the larger industrial generators from 8 kW (11 kVA) up to 2,000 kW (2,500 kVA three phase) used for large office complexes, factories, or other uses. A combination of these modules are used for small power stations and these may use from one to 20 units per power section and these sections can be combined to involve hundreds of power modules.

One or more diesel generators operating without a connection to an electrical grid are referred to as operating in "island mode." Operating generators in parallel provides the advantage of redundancy, and can provide better efficiency at partial loads. An islanded power plant intended for primary power source of an isolated community may often have at least three diesel generators, any two of which are rated to carry the required load. Groups of up to 20 are commonplace.

Generators can be electrically connected together through the process of synchronization. Synchronization involves matching voltage, frequency and phase before connecting the generator to the system. Failure to synchronize before connection could cause a high short circuit current or wear and tear on the generator or its switchgear. The synchronization process can be done automatically by an auto-synchronizer module, or manually by the instructed operator. The auto-synchronizer will read the voltage, frequency and phase parameters from the generator and busbar voltages, while regulating the speed through an engine governor or ECM (Engine Control Module). Hence, diesel gen sets can be highly susceptible to over-voltage or over-frequency conditions in a microgrid environment. System 100 of FIG. 1 incorporates an autonomous, rapid response energy storage system 110 operated by controller 120 to address such issues, as further discussed below.

Figure 3:
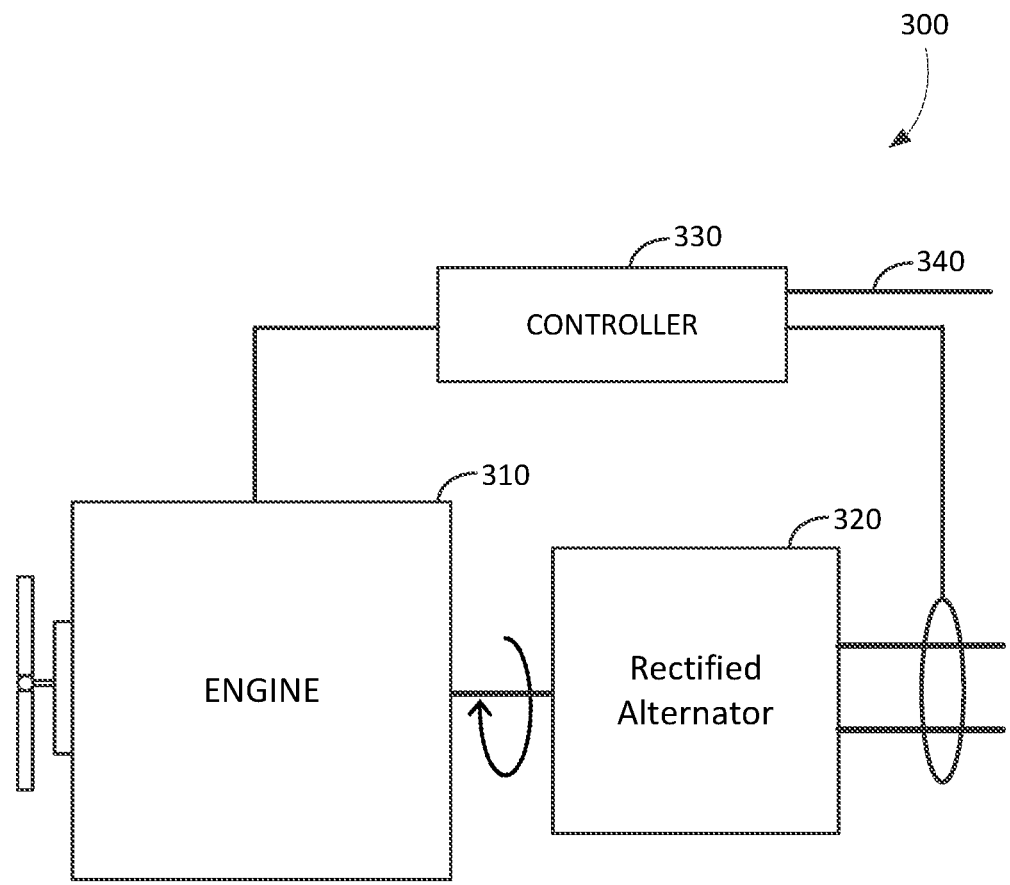
FIG. 3 shows a diesel generator set configured for a microgrid system, according to certain embodiments.

FIG. 3 shows one example of a typical generator set 300 that may be used in microgrid system 100, according to certain embodiments. Generator set 300 may include engine 310, rectified alternator 320, and controller 330. Controller 330 may be fed by the output of rectified alternator 320 and/or a second controller input 340. Controller 330 can control the speed (i.e., power output) of engine 310 and may be modulated based on the rectified alternator output. Controller 330 may further be controlled by other controllers or feedback systems. For instance, some aspects may be controlled by controller 120 of FIG. 1.

Engine 310 can be a diesel engine having a shaft or other coupling means that feeds rectified alternator 320. Rectified alternator 320 can include an alternator portion that converts rotational mechanical energy (produced by engine 310) into an alternating current (AC)-based power. The alternating current can then be regulated (i.e., rectified), which converts the AC-based power into a direct current (DC)-based power. The many types of engines, alternators, rectifiers, and the like, are not discussed in detail as such technology and applications thereof would be appreciated by one of ordinary skill in the art with the benefit of this disclosure.

An Exemplary Microgrid System

Figure 4:
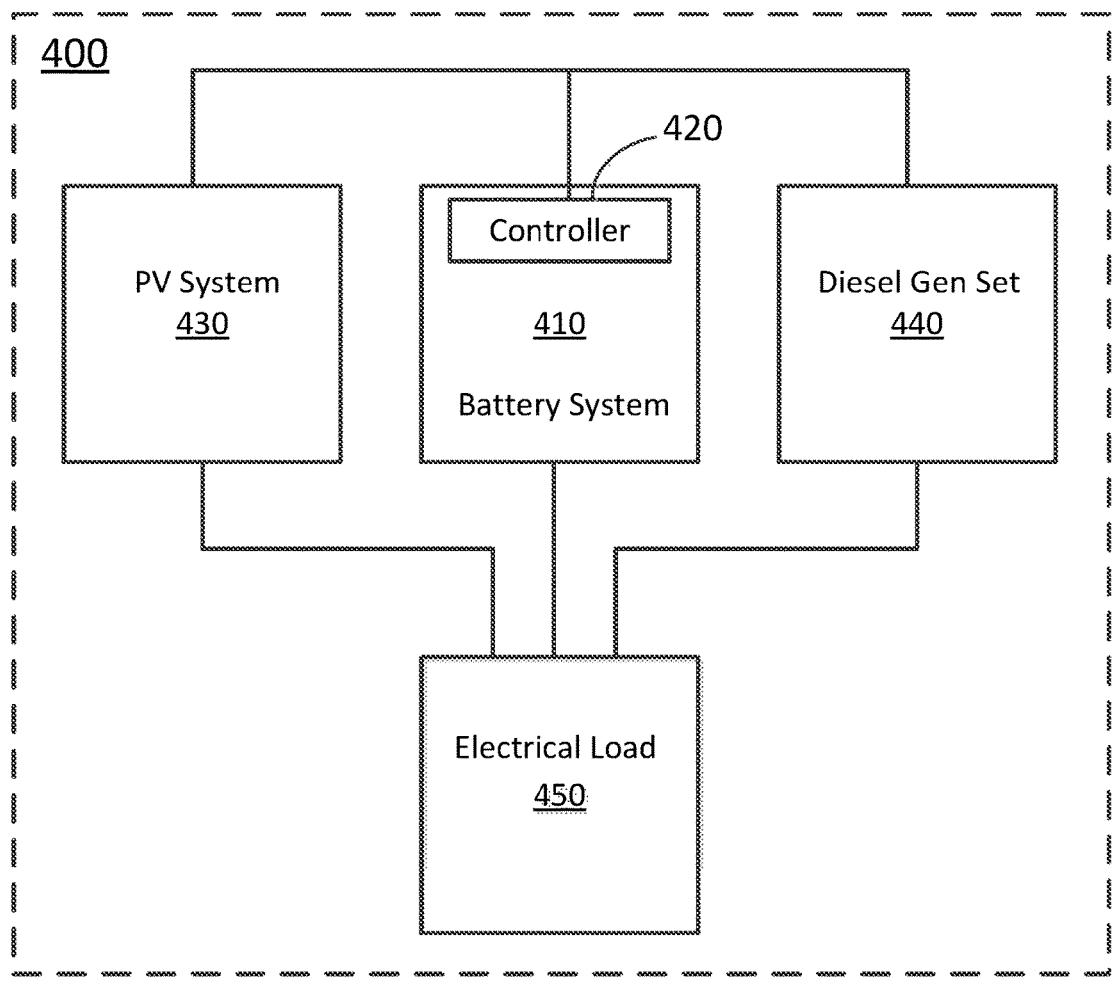
FIG. 4 shows a typical microgrid system, according to certain embodiments.

FIG. 4 shows a typical microgrid system 400, according to certain embodiments. Microgrid system can include battery system 410, PV-based EG system 430, diesel generator set 440, electrical load 450, and controller 420. Controller 420 can be housed in battery system 410, or may exist as a physically separate entity. Microgrid system 400 may have similar aspects with respect to microgrid system 100, including similar EG systems, controller, load, etc.

Microgrid system 400 is shown for the purpose of providing an example of what a typical microgrid system may include in the field, including components and operational conditions. It should be understood that microgrid system 400 is a particular embodiment, and many different embodiments are possible, as discussed throughout this disclosure. For instance, some embodiments may have more of fewer EG resources, multiple loads, multiple controllers working separately or in tandem, multiple battery systems, or other microgrid assets, as would be understood by one of ordinary skill in the art.

Referring to microgrid system 400, PV system 430 may include any suitable photo-voltaic-based energy generation systems. In some embodiments, PV system 430 can produce up to 1.05 MWh of AC power, which is AC-DC converted by a local inverter (e.g., see inverter 226 of FIG. 2), and available to supply to battery system 410 or load 450. In some embodiments, diesel generator set 440 can produce up to 1 MWh of power, which may be converted to DC power (see, e.g., FIG. 3) and available to provision load 450 or charge battery system 410. Other PV and Diesel generator system sizes are possible. Battery system 410 may be a 4.5 MWh system having a maximum temperature-dependent instantaneous charge and discharge rate of 750 KWh. Other ranges and charge/discharge performance characteristics are possible. Load 450 can be 300 kWh on average and may fluctuate over time. Higher and lower load values are possible.

An Exemplary Operational State Table

FIG. 5 shows a state table 500 for an energy storage system 110 in a microgrid 100, according to certain embodiments. State table 500 shows a typical set of operating states that may be used in microgrid system 100, according to certain embodiments. Each state is described by referring generically to various microgrid systems and functions including PV generation, diesel power generation, loads, and the like. It should be understood that the following states can be applied to any of the embodiments described herein, including embodiments of FIG. 1, and references to PV generation, diesel-based power generation, loads, and energy storage (storage device, battery), for example, can correspond to EG systems 130-36, EG systems 140-46, electrical load 150, and ES system 110, respectively.

In state 1, solar PV is ON, storage is ON, and diesel gen is OFF. In state 1, PV typically supplies (provisions) the load and excess PV generation is stored in ES system 110. The storage device can function as a "shock absorber" and offsets any shortage or excess of supply due to intermittent PV production and load fluctuations. PV output can be curtailed when PV generation is greater than the sum of the load (e.g., 300 kW) plus the instantaneous charge capacity of the storage device (e.g., 750 kW), or when the storage device state-of-energy is near its full capacity and PV generation is greater than the load. In state 1, reactive power can be provided by both the PV inverters and storage device power converter systems (not shown). In some cases, if ES system 110 state-of-energy gets close to the minimum level of state 1, then one or more diesel generator (EG systems 140-46) may be brought online. In one aspect, state 1 is the preferred mode of operation and control system 120 may operate to direct the system toward this state from the other possible states.

In state 2, solar PV is ON, storage is ON, and diesel gen is ON. In state 2, the diesel generator(s) typically dispatch enough power to meet the load demand. Storage device can typically offset any shortage or excess of supply due to load fluctuations. PV output can be curtailed when PV generation is greater than the instantaneous charge capacity of the storage device (e.g., 750 kW). In state 2, reactive power can be provided by the diesel generators (EG system 140) and the energy storage power converter systems (not shown). Even in cases of low PV production, there can be some production during the day and as the storage device state-of-energy increases above the minimum level, the diesel generator(s) may go offline. In some embodiments, the minimum level may include some margin (i.e., hysteresis) to reduce frequent switching between states.

In state 3, solar PV is OFF, storage is OFF, and diesel gen is ON. In some aspects, state 3 is an atypical state and only typically happens when the storage device and solar PV systems are unavailable (e.g., when a fault has occurred behind the point of interconnection of the PV system and storage device or when the storage device is taken offline for maintenance). The diesel generator will operate in isochronous control mode (as would be appreciated by one of ordinary skill in the art) and the control system may not need to control its active and reactive power output. When the storage device and solar PV become available, the diesel generators may have to be tripped offline, and depending on the state-of-energy of the batteries, the system may return to state 1 or 2, as described above. Transitioning in and out of state 3 may need to be initiated by a system operator and may require an outage to occur.

In state 4, solar PV is ON, storage is OFF, and diesel gen is ON. In some aspects, state 4 is also an atypical state and only typically happens when energy storage is unavailable (e.g. when there is an internal fault in the energy storage system). If energy storage was previously operating in state 2 (and hence, the energy storage was operating as a voltage source, and the diesel generator was synchronized to the voltage and frequency reference points of the energy storage system and operating in base-load mode), then the internal protection system of both the solar PV inverters (e.g., inverter(s) 206) and the diesel generators may trip them offline (and if they fail to do so, the control system (e.g., controller 120) may trip them offline), and proceed to state 8, as described below. If the energy storage system was previously operating in state 3, and the PV system was brought online by error, then the control system may trip the PV Inverter offline and maintain state 3. Typically, the microgrid immediately leaves state 4 (i.e., either the internal protection system of the PV inverters and the diesel generators or the control system (e.g., controller 120) changes to another state as described above).

In state 5, solar PV is OFF, storage is ON, and diesel gen is OFF. The system typically enters state 5 at nighttime when the PV inverters are offline or when the Solar PV Inverters are unavailable (e.g. the system was previously operating in state 1 and the internal protection system of the PV inverters inadvertently tripped the PV system offline). The system may continue operation similar to state 1 (with no PV production). If, due to sustained PV outage, the battery state-of-energy reaches a predefined or algorithmically determined low level, then the control system will bring the diesel generators online, and enter state 6. At any time, the system operators can choose to trip the energy storage system offline, and bring the diesel generators online in Isochronous or Droop Control mode (i.e., switch to state 3), but may require an outage.

In state 6, solar PV is OFF, storage is ON, and diesel gen is ON. In some aspects, state 6 is an atypical state and may only happen when the Solar PV system is unavailable (e.g., the system was previously operating in state 3 and the internal protection system of the PV inverters inadvertently tripped the PV system offline). The energy storage system may continue operation similar to state 2, but with no PV production. If system operators foresee a sustained PV outage, they can trip the energy storage system offline, and bring the diesel generators online in Isochronous or Droop Control mode (i.e., switch to state 3), but may require an outage.

In state 7, solar PV is ON, storage is OFF, and diesel gen is OFF. In some aspects, state 7 is an atypical state and usually only happens when the energy storage system is unavailable (e.g. the system was previously operating in state 1 and an internal fault occurred in the energy storage system). In such cases, the internal protection system of PV Inverters may trip the PV system offline (and if they fail to do so, then control system may trip the PV system offline), and switch to state 8.

In state 8, solar PV is OFF, storage is OFF, and diesel gen is OFF. In state 8, black-start operation typically has to be initiated by the operator to re-energize the microgrid island. System restoration, generally, would be understood by one of ordinary skill in the art.

FIG. 6 shows example state table 600 for calculating target charge/discharge levels of ES system 110 in microgrid 100, according to certain embodiments. Controller 120 may constantly monitor the state-of-energy of the energy storage system (e.g., ES system 110). Based on the state-of-energy, a target or preferred charge and discharge level of the energy storage system is determined to bring it to a target or preferred range. In some cases, it may be advantageous to keep the battery not too empty and not too full to maintain capacity to, e.g., offset fluctuations in the PV system by charging and discharging accordingly. In an aspect, this may have advantages of improving battery life as well.

Controller 120 may control ES system 110 indirectly in a number of different states (e.g., L1-L5, as described below). Each state can have a predetermined charge value and discharge value corresponding to the state-of-energy of the energy storage device, which are used to achieve the preferred state-of-energy. Controller 120 can then control power generation of EG systems 130, 140 based on the load demand and the operational state (i.e., preferred charge/discharge values) of ES system 110. EG systems 130, 140 can then provision the load, recharge the energy storage device, or cease energy generation or shutdown accordingly.

One technical advantage of controlling the dispatching of EG systems (e.g., PV systems) based on the state-of-energy of an energy storage device is expediency. A typical microgrid incorporates many sensors that read data, makes decisions (sometimes on remote processors), and then generates and sends control commands to each device in the grid. Each operation adds delay, which may be on the order of seconds (e.g., 1-3 seconds). In contrast, an energy storage device can be operated autonomously to begin charging or discharging in a much shorter time frame (e.g., 10-20 ms). This fast response time can help to maintain supply/demand equality in case of sudden and significant load fluctuations (e.g., when part of the distribution feeder trips offline due to a fault, which in turns results in sudden load drop). Furthermore, the energy storage system can quickly offset (absorb) fluctuations in the PV generations or the load requirement, while the EG systems and microgrid operation, in general, is still adapting to the changes.

Referring back to FIG. 6, state table 600 includes five state-of-energy levels including "Too Low" (L1), "Low" (L2), "Normal" (L3), "High" (L4), and "Too High" (L5). The following examples are shown to illustrate the operation of controller 120 in microgrid system 100. It should be understood that more states or fewer states may be used, different numbers of resources (e.g., EG systems), sizes or capacities of resources, configurations of resources, and types of resources (e.g., wind energy, solar energy, diesel power, etc.), may be used, as would be appreciated by one of ordinary skill in the art.

In an embodiment, FIG. 1 includes a solar PV system (EG system 130) that can generate 1.00 MW of AC power. The energy storage device (ES system 110) can be, for example, a 4.5 MWh system with an instantaneous power charge/discharge rate of 750 kVA (active and reactive power). While these numbers may be used to illustrate a particular system, it will be understood from the disclosure herein that similar calculations can be used for systems of differing sizes and capabilities. In an aspect, system 100 may be designed to accommodate a peak load (electrical load 150) that is about 300 KW. In such a system, at peak load and peak PV generation, PV (for example, EG system 130) produces 1 MW of power, load 150 draws 300 KW, and the excess 700 KW gets pushed to/stored by the energy storage system (ES system 110). In an aspect, microgrid 100 further includes a diesel gen set (EG system 140) that can generate 1.00 MW of AC power.

State table 600 includes a number of formulas (algorithms) and symbols defining the operation of controller 120 in each particular state, in an example embodiment. $P_{DISCHARGE}$ can be the maximum active power that the energy storage system can supply at a given time. $P_{CHARGE}$ can be the maximum active power that the energy storage system can store at a given time; in other aspects, these could be defined as less than maximum constant or calculated values. Both $P_{DISCHARGE}$ and $P_{CHARGE}$ may be dependent on the state-of-energy of the energy storage system, its temperature, or other operating conditions. $P_{CHARGE-OPT}$ can be the selected and/or preferred charge limit of the energy storage system. The charge rate is generally used to control the PV generation output (e.g., EG system 130). In normal operation, PV generation is typically used to both provision the load and charge the energy storage system when excess energy is generated (i.e., energy beyond the load requirement).

$P_{DISCHARGE-OPT}$ can be the selected and/or preferred discharge limit of the energy storage system. The optimal discharge rate for the energy storage system is generally used to control the diesel gen set output (e.g., EG system 140). In some embodiments, the diesel gen sets are generally disconnected and only power up and provide energy to the load when the energy storage system has a low state-of-energy (e.g., states L1 and L2). In an aspect, diesel gen sets may typically provision the load and are not used to charge the energy storage system because of inherent inefficiencies in energy conversion, except for extreme conditions (e.g., ES system 110 very near 0% state-of-energy). $P_L$ can be the current active power demand; $P_{PV}$ can be the maximum PV generation allowed; and $P_{DIESEL}$ can be the instantaneous active power output of the diesel generators. In some embodiments, simplified representations of $P_{DIESEL}$ and $P_{PV}$ can be defined by the following equations:

$$P_{DIESEL} = P_L - P_{DISCHARGE\text{-}OPT} \quad (1)$$

$$P_{PV} = P_L + P_{CHARGE\text{-}OPT} - P_{DIESEL} - [\text{Load Drop Margin}] \quad (2)$$

Where, [Load Drop Margin]=[Instantaneous Active Power Demand]*[Load Drop Factor], and where, [Load Drop Factor] can represent the maximum probable sudden load drop. This value can range from 0 to 1 (corresponding to 0% to 100% sudden load drop) depending on the microgrid's load characteristics.

Generally, the energy storage device should maintain a high state-of-energy to provision the load in times of low PV generation (e.g., periods of no sunlight), but with still enough headroom to offset fluctuations in PV generation and the load. Controller 120 can be configured to include adequate protection to trip the energy storage device offline if its state-of-charge reaches a dangerously high or low level (see e.g., state table 500). In addition to the above categories, hysteresis may also be defined in between the state categories in order to prevent continuous change in selected charge/discharge limits when that state-of-energy is near a limit, as further discussed below with respect to FIG. 6.

Referring back to state table 600, at state L5 ("Too High"), controller 120 prioritizes an immediate discharge of the energy storage device to return it to optimal levels (e.g., state L3 or L4) to absorb or offset fluctuations in the PV system or load. That is, in the "too high" state, the energy storage system should become the primary source in the microgrid and be discharged to any available load. Typically, controller 120 will prevent the energy storage system from reaching this state. $P_{CHARGE\text{-}OPT}$, as shown in state table 600, can be defined by the following equation:

$$P_{CHARGE\text{-}OPT} = (-)\min\{P_L, P_{DISCHARGE}\} \quad (3)$$

Thus, for example, in the situation described above with respect to FIG. 4, $P_{CHARGE\text{-}OPT}$ is $-300$ KW, $P_{DIESEL}=0$, and $P_{PV}=0$. That is, the energy storage system provides the load requirement (300 KW), while the PV system and Diesel gen sets are shutdown, thereby prioritizing the discharge of the energy storage system to reach a preferred state-of-energy (e.g., L3 or L4). In an aspect, this is achieved by the controller 120 curtailing the PV system generation, which in the example illustrated would cause the temporary shutdown of the PV system thereby bleeding excess charge from the ES system, which reacts much more quickly than an EG system to meet the load requirements.

At state L4 ("High" state), the optimal charge is 0 and the optimal discharge can be the maximum allowable discharge rate of the energy storage system, as shown in state table 600. In state L4, the energy storage system either remains idle or offsets shortage/excess generation by PV. Using the specifications of the example of FIG. 4, $P_{CHARGE\text{-}OPT}=0$, $P_{DIESEL}=0$, and $P_{PV}=300$ KW. That is, the PV system provisions the load (300 KW), while the Diesel gen sets remain shut down. Thus, the PV system can provision the load (in contrast to L5), but any excess PV generation is curtailed at the inverter(s) (e.g. inverter 206) and is not used to charge the energy storage system.

At state L3 ("Normal" state), the energy storage device may be charged or discharged at any rate up to the corresponding maximum charge and discharge limits, according to certain embodiments. In this way, PV system 130 can be utilized to meet the system and load and, if excess generation is available, to charge ES system 110 while remaining within the "Normal" band. Contrarily, if the load cannot be met by PV system 130, the ES system 110 can discharge to make up the difference.

At state L2 ("Low" state), the optimal discharge is 0 and the optimal charge can be the maximum allowable charge rate of the energy storage system, as shown in state table 600. In state L2, the energy storage device should not be relied on for supplying the load and is typically used to charge from an available excess of PV generation. This allows the energy storage device to eventually charge back up to a preferable state-of-energy as excess PV generation becomes available. Also, the diesel generators come online as the state-of-energy reaches lower levels. Likewise, all "preferred" or "optimal" levels defined by table 600 are subject to certain tolerances (which can be programmable) that can deviate from these defined values, which would be understood and expected by one of ordinary skill in the art. While the optimal discharge of the ES is 0, it should be noted that the ES system may still be used to offset a temporary shortage of supply due to the slow response time of the diesel generator(s) to sudden fluctuations in load demand.

At state L1 ("Too Low"), the optimal discharge can be 0. In other embodiments, the preferred discharge can be $-k$, where k is a configurable constant that can be set based on the available diesel generation capacity, and the optimal or preferred charge can be the maximum allowable charge rate of the energy storage system, as shown in state table 600. The control system typically prevents the state-of-energy of the energy storage system from entering this state by using only the EG resources to supply the load. In this state, the energy storage system may be charged by any available resource (e.g., either PV generation or diesel generator). The controller 120 may spin up one or more EG systems 140, such as a diesel generator to help meet the load and/or charge the ES system 110.

Any suitable range can be associated with each state. Certain exemplary embodiments may include 0-200 kWh for state L1, 200-400 kWh for state L2, 400-2100 kWh for state L3, 2100-2300 kWh for state L4, and 2300-2500 for state L5. Shorter or longer ranges can be associated with each state. More or fewer states can be used. In some implementations, hysteresis bands (e.g., 50-100 kWh) are included in one or more of states.

In some embodiments, the target charge and target discharge values may be static, or may be dynamically calculated based on system variables such as the instantaneous charge and/or discharge capacity of the energy storage system and/or load demand. For example, L1 may have a static target charge and target discharge value, while L5 may be dynamically calculated (e.g., in real-time) based on the load and instantaneous discharge capacity. Any number of states can be used, and any one of said states can include target charge/discharge values that are static or dynamic, in any suitable combination. In certain embodiments, the dynamically calculated target charge and discharge values can be determined based on other inputs as well (e.g., available energy generation resources, predicted changes to a load or EG system characteristics, etc.), as would be appreciated by one of ordinary skill in the art. The concept of the utilization of static and dynamic target charge/discharge rates can be applied to any of the examples, embodiments, figures, systems, or any aspect of the present disclosure.

Figure 7:
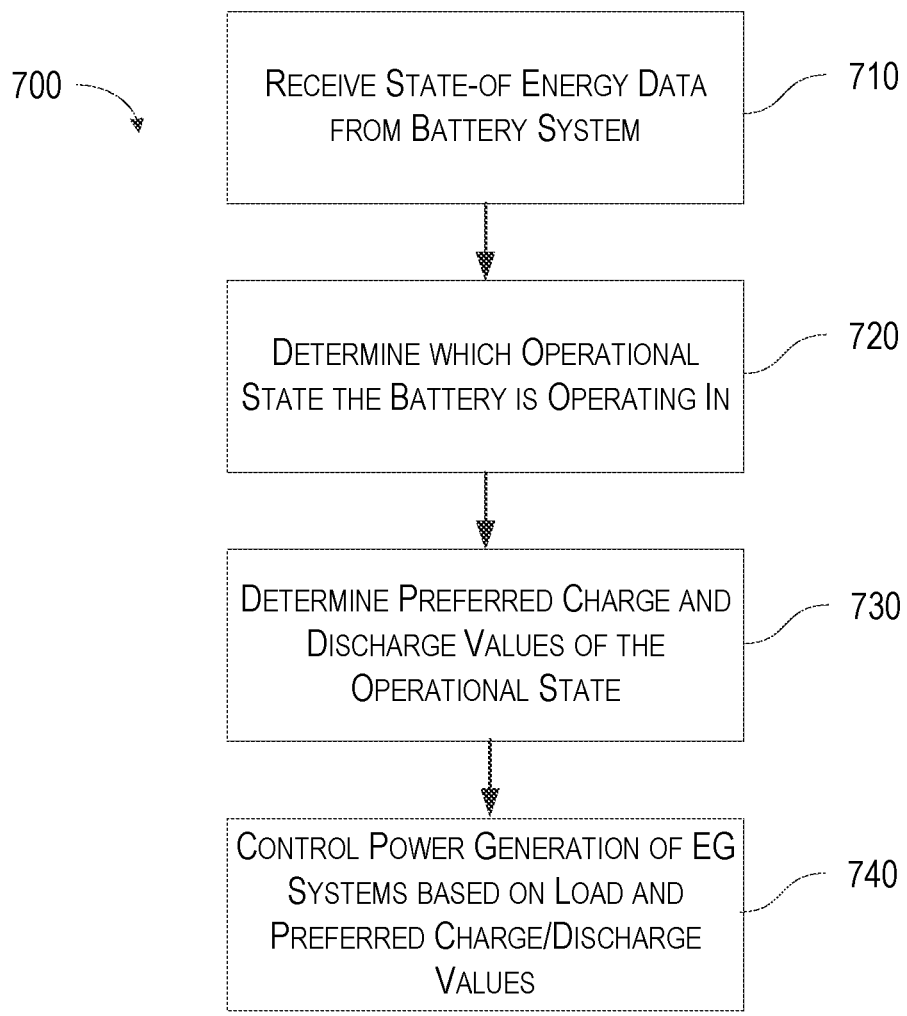
FIG. 7 shows a simplified flow chart for controlling the operation of EG devices in a microgrid system, according to certain embodiments.

FIG. 7 shows a simplified flow chart 700 for controlling the charging and discharging of energy generation devices in a microgrid system, according to certain embodiments. Method 700 (as well as methods 700, 800, 900, and 1100 discussed below) can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, methods 700-900 and 1100 can be performed by controller 120 of FIG. 1, one or more processors, or other suitable computing device, as discussed with respect to FIGS. 1, 2, and 7.

At step 710, method 700 includes receiving state-of-energy data from an energy storage system (e.g., energy storage system 110). Any suitable energy storage system or device (e.g., battery) can be used. The energy storage system can communicate its state-of-energy data through any suitable wireless or hardwired communication protocol, as shown in FIGS. 1 and 2. In some embodiments, the energy storage system may be coupled to an EG system and an electrical load.

At step 720, method 700 includes determining in which operational state the energy storage system is operating. At 730, method 700 includes determining what the preferred (optimal or predetermined) charge values and discharge values are for the current functional state. These values may inform how to operate the EG devices (e.g., EG device 130, 140) in light of a load demand and/or the present state-of-energy. Some examples of the functional state boundaries are described above with respect to FIG. 6.

At step 740, method 700 includes controlling the power generation of one or more EG systems (e.g., PV-based systems 130, diesel gen set 140), based on a load requirement and the state-of-energy of the energy storage system.

It should be appreciated that the specific steps illustrated in FIG. 7 provides a particular method 700 of controlling the charging and discharging of an energy storage device in a microgrid system, according to certain embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

Figure 8:
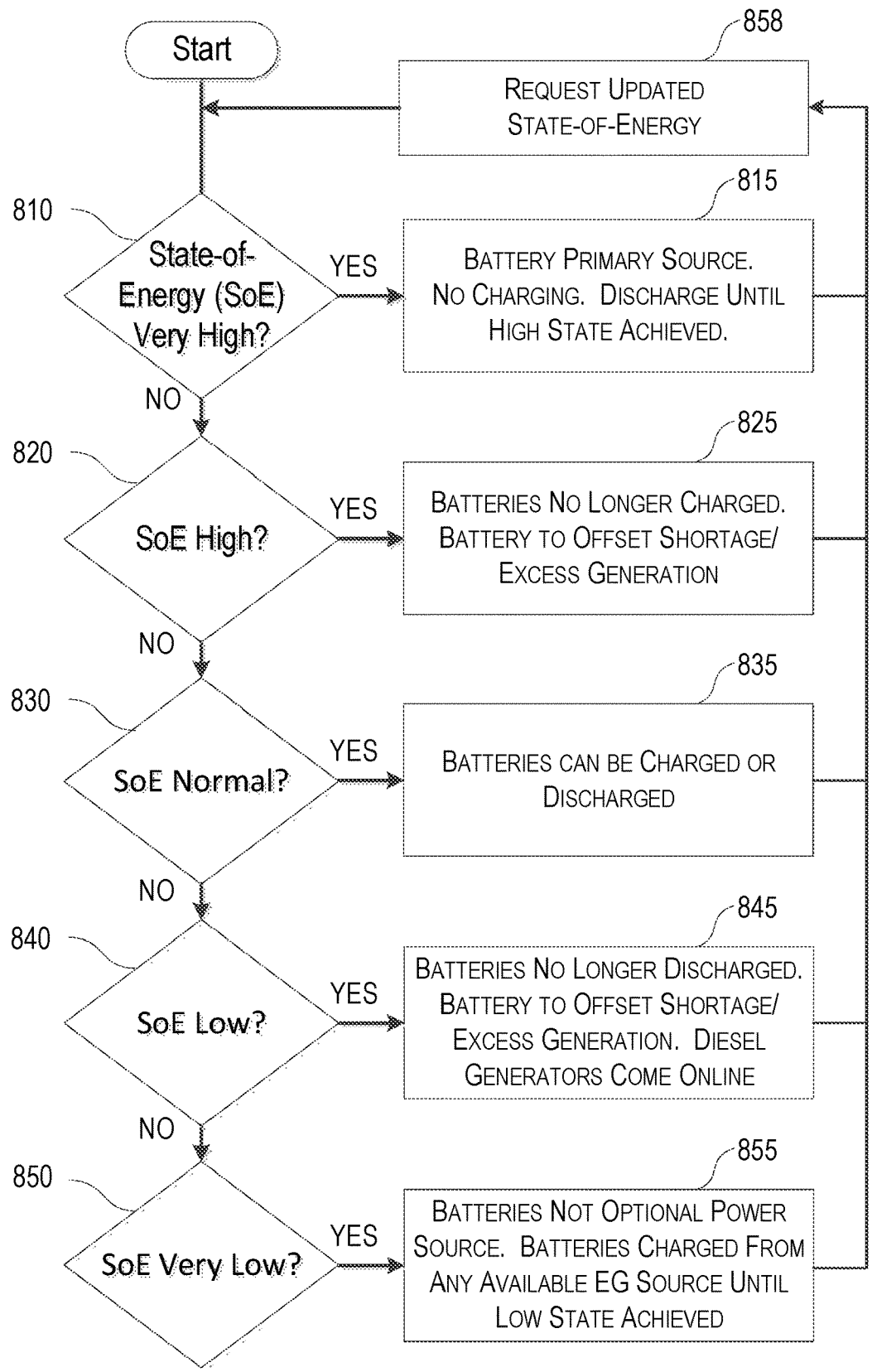
FIG. 8 shows a simplified flow chart for controlling the charging and discharging of an energy storage device in a microgrid system, according to certain embodiments.

FIG. 8 shows a simplified flow chart 800 for controlling the charging and discharging of an energy storage device in a microgrid system, according to certain embodiments. Flow chart 800 shows how certain embodiments may operate when all EG systems (particularly PV-based EG systems) are available and generating power. For instance, PV systems generally produce power during periods of sunlight (daytime hours). The system of FIG. 1 can be used to implement the operational states described in flow chart 800.

At step 810, if the SoE is very high, the battery (e.g., energy storage system 110) becomes the primary power source and solely provisions the load (i.e., the EG systems do not provision the load)(step 815). In the "very high" functional state, the battery is not charged and will continue to discharge to the load until the "high" functional state is reached. That is, an operational priority is to discharge the battery to avoid a 100% charge condition, which may prevent the battery from absorbing any rapid changes in the load caused by, e.g., load fluctuations or changes in EG generation capabilities.

At step 820, if the SoE is "high," the battery is no longer charged by the EG systems and operates to offset any shortage or excess generation that may occur before the EG systems can compensate for such changes (step 825). In the "high" state, there is typically no operational priority to offset any charge on the battery. At step 830, if the SoE is "normal," the battery can be charged or discharged at any suitable rate (e.g., max charge/discharge rate that the battery can support)(step 835).

At step 840, if the SoE is "low," the battery is no longer discharged, regardless of the load need, and a second EG system is brought online (e.g., diesel EG system 140) to provisional the load (step 845). In the "low" state, the PV system typically charges the battery, however the diesel gen sets may be used for charging purposes in certain conditions. Although the battery may have a low SoE, there is still enough charge to offset any shortage or excess generation that may occur before the EG system can compensate for such changes.

At step 850, if the SoE is "very low," the battery is no longer an optional power source. The battery is charged by any available EG source (PV-based 130, diesel gen sets 140, or other EG source) until the "low" state is reached (step 855). In the "very low" state, the diesel get sets are kept on to both provision the load (especially if PV output cannot accommodate the load) and charge the battery.

In certain implementations, the SoE of the battery can be ascertained (i.e., requested and received) by the controller at any suitable frequency or consistent basis. For example, the SoE can be queried at a particular interval (e.g., seconds, minutes, hours, etc.) or other linear or non-linear basis. Certain events in the microgrid may affect the frequency at which the controller queries the SoE of the battery. For instance, an increase in the frequency of SoE queries may occur during periods where certain EG resources are not available (e.g., PV-based power during periods of no sunlight, diesel generator malfunction, etc.) or where the load fluctuates beyond typical levels. Referring to method 800, the controller can request an updated SoE (step 858) after the SoE is determined (e.g., steps 810, 820, 830, 840, 850) at any preferred frequency, as indicated above. As the SoE changes, the operational state of the battery may change, as further described above with respect to FIGS. 5-7.

It should be appreciated that the specific steps illustrated in FIG. 8 provides a particular method 800 of controlling the charging and discharging of an energy storage device in a microgrid system, according to certain embodiments. Other sequences of steps may also be performed according to alternative embodiments. For example, alternative embodiments may perform the steps outlined above in a different order, such as starting the present state inquiry at the "very low state." Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Figure 9:
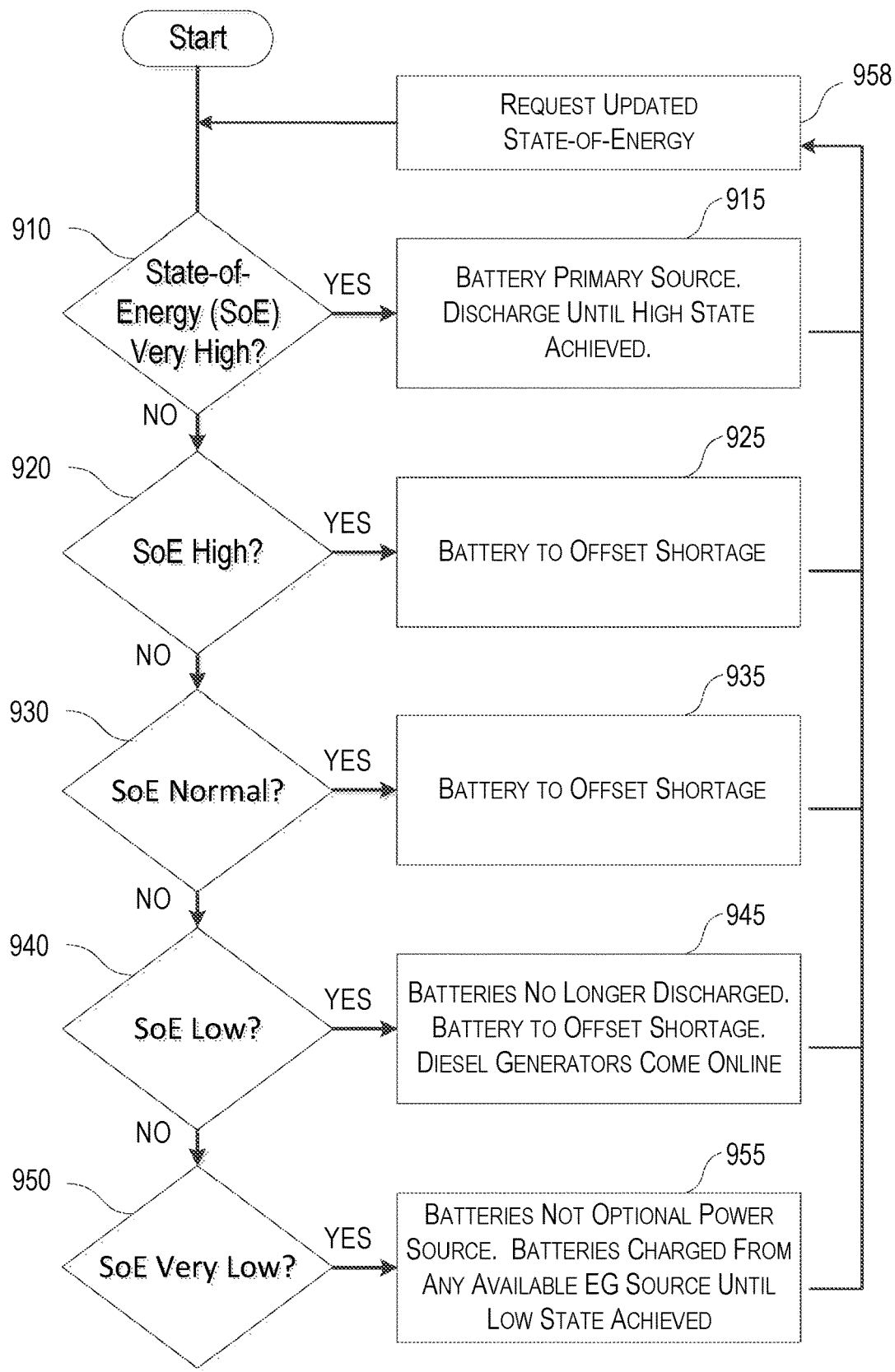
FIG. 9 shows a simplified flow chart for controlling the charging and discharging of an energy storage device in a microgrid system, according to certain embodiments.

FIG. 9 shows a simplified flow chart 900 for controlling the charging and discharging of an energy storage device in a microgrid system, according to certain embodiments. Flow chart 900 shows how certain embodiments may operate when certain EG systems (particularly PV-based EG systems) are unavailable and do not generate any appreciable amount of power. For instance, PV systems generally do not produce power during periods of no sunlight (night time hours). Thus, flow chart 900 shows how a system 100 may operate when one EG system is not available. The system of FIG. 1 can be used to implement the operational states described in flow chart 900.

At step 910, if the SoE is very high, the battery (e.g., energy storage system 110) becomes the primary power source and solely provisions the load (step 915). In the "very high" functional state, the battery will continue to discharge to the load until the "high" functional state is reached, as similarly described above with respect to step 810 of FIG. 8.

At step 920, if the SoE is "high," the operates to offset any shortage, which can be similar to the "very high" state. In the "high" state, there is typically no operational priority to offset any charge on the battery (step 925). At step 930, if the SoE is "normal," the battery can be discharged at any suitable rate (e.g., max discharge rate that the battery can support). Since there is little to no PV generation during periods of no sunlight, and thereby no provisioning of the load by the PV system, the battery will generally continue discharging to provision the load from the "very high" state to the "normal" state (step 935).

At step 940, if the SoE is "low," the battery is no longer discharged, regardless of the load need, and an alternative, second EG system is brought online (e.g., diesel EG system 140) to provisional the load (step 945). In the "low" state, the PV system is not available to charge the battery during periods of no sunlight. Thus, the diesel gen sets may be used for charging purposes in certain conditions in the "low" state. Although the battery may have a low SoE, there is still enough charge to offset any shortage that may occur before the EG system can compensate for such changes.

At step 950, if the SoE is "very low," the battery is no longer an optional power source (step 955). The battery is charged by any available EG source (diesel gen sets 140) until the "low" state is reached. In the "very low" state, the diesel get sets are kept on to both provision the load (especially if PV output cannot accommodate the load) and charge the battery.

Similar to method 800, the controller can request an updated SoE (step 958) after the SoE is determined (e.g., steps 910, 920, 930, 940, 950) at any preferred frequency, as indicated above. As the SoE changes, the operational state of the battery may change, as further described above with respect to FIGS. 5-7.

It should be appreciated that the specific steps illustrated in FIG. 9 provides a particular method 900 of controlling the charging and discharging of an energy storage device in a microgrid system, according to certain embodiments. Other sequences of steps may also be performed according to alternative embodiments. For example, alternative embodiments may perform the steps outlined above in a different order, such as starting the present state inquiry at the "very low state." Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

Figure 10:
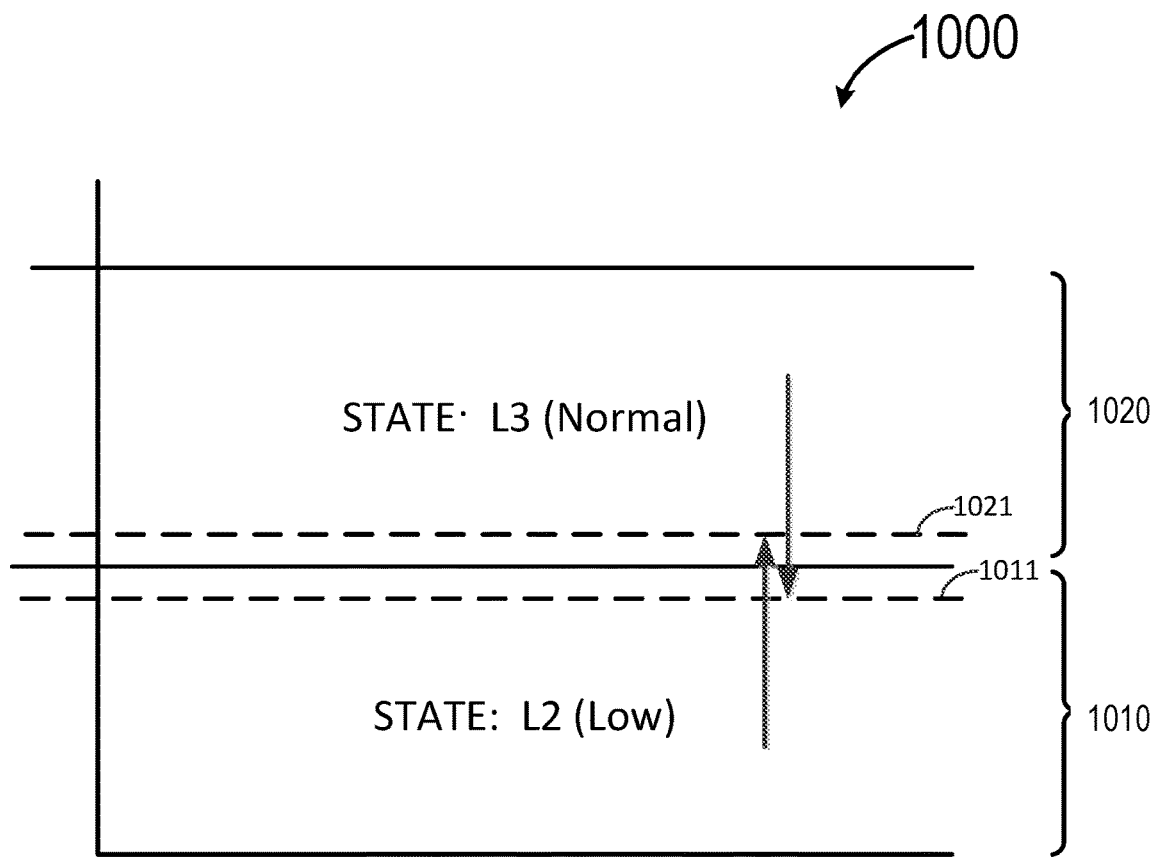
FIG. 10 shows a chart illustrating aspects of using hysteresis bands to further define an operating state of an energy storage system in a microgrid system, according to certain embodiments.

FIG. 10 shows a chart 1000 illustrating the use of hysteresis bands to further define an operating state of an energy storage system 110 in a microgrid 100, according to certain embodiments. Chart 1000 includes aspects discussed in reference to FIG. 5, including operational states L2 (1010) and L3 (1020). As discussed above, a number of operational states are used to control the charging and discharging of the energy storage system. Each operational state corresponds to a range of states-of-energy.

Sometimes the current state-of-energy may be close to a border, which may cause inefficient system operations. For instance, in an aspect, when the state-of-energy causes a change from state L3 to L2, the diesel generators (EG system 140) are turned on in preparation for possibly supplying power to help meet the load. If the load fluctuates (e.g., load 150) or the PV output (EG system 130) state-of-energy erratically rises and falls due to cloudy weather, it may cause energy storage system 110 to frequently switch between states L2 and L3, thereby causing the diesel generators to continually power off and power back on, which can negatively affect the efficiency of the diesel generators and microgrid 100 generally, affect the longevity of the diesel gen sets themselves, and may introduce other losses and inefficiencies.

To resolve this problem, hysteresis may be introduced into the system at some or all of the boundaries between the operational states. Chart 1000 shows a hysteresis-based boundary 1021 for changing from operational state L2 to L3 and another boundary 1011 for changing from L3 back to L2. Thus, small fluctuations in PV output or the load may not cause a switch between operational states provided that the traversal from one operational state to the next is less than the hysteresis-based boundary.

In some embodiments, time delays may be factored in when applying hysteresis when changing between operational states. For instance, if the SoE of a battery briefly crosses a boundary between operational states (e.g., L3 to L2)—thus triggering an initial state change—but then returns within a hysteresis border below a predetermined or calculated time period (e.g., 10 seconds, 10 minutes, an hour or more) back to its original operational state, the system may be configured to remain in the second operational state (e.g., L2). In contrast, under the same conditions, but with the SoE remaining in the hysteresis border for greater than the time period, the system may be configured to change back to the original operational state (e.g., L3). Operational states may be referred to as functional states.

Figure 11:
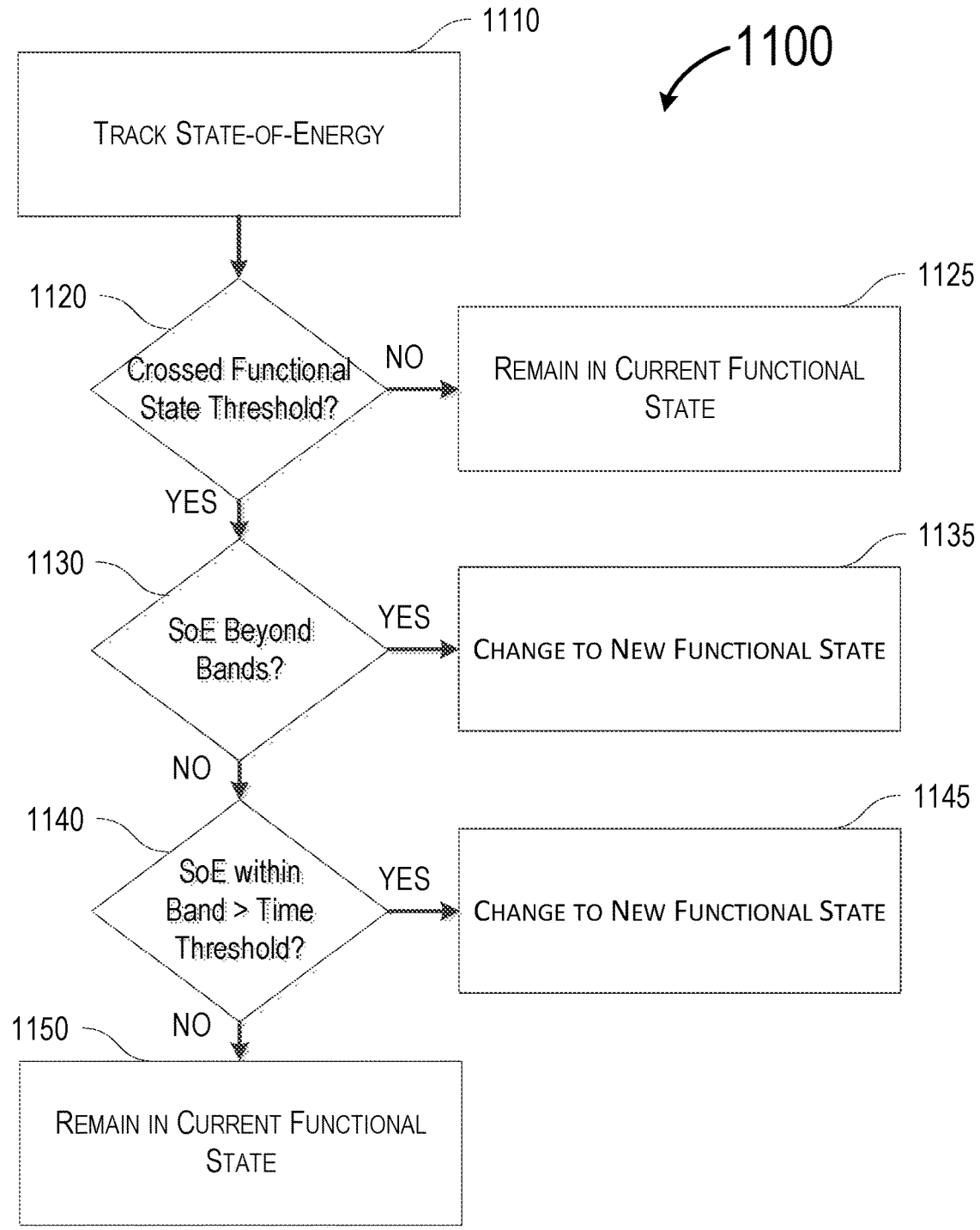
FIG. 11 shows a simplified flow chart showing the use of hysteresis bands to further define an operating state of an energy storage system in a microgrid system, according to certain embodiments.

FIG. 11 shows a simplified flow chart 1100 for including hysteresis bands in one or more operational states of an energy storage system (140), according to certain embodiments. At step 1110, method 1100 includes tracking a current SoE of an energy storage system (e.g., energy storage system 140). At step 1120, if a functional state threshold (e.g., L3 to L2 of FIG. 10) is not crossed, then the energy storage system remains in its current functional state (e.g., L3) (step 1125). At step 1130, if the functional state threshold is crossed, and the SoE has moved beyond the hysteresis bands (e.g., L3 to L2 and beyond threshold 1011), then the energy storage system changes to the new functional state (L2) (step 1135). At step 1140, if the functional state threshold is crossed, and the SoE is within the hysteresis bands (e.g., threshold 1011) for a predetermined time threshold (e.g., 10 seconds), then the energy storage system changes to the new functional state (L2) (step 1145). At step 1150, if the functional state threshold is crossed, and the SoE is not within the hysteresis bands (e.g., threshold 1011) for a predetermined time threshold (e.g., SoE returns to L3 before time threshold), then the energy storage system remains in its current functional state (L3).

It should be appreciated that the specific steps illustrated in FIG. 11 provides a particular method 1100 for including hysteresis bands in one or more operational states of an energy storage system, according to certain embodiments.

Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

Examples of Islanded Operation in a Microgrid
(Normal Operating Mode)

For island communities, microgrids (e.g., microgrid 100) can operate independently from a broader grid system (e.g., utility grid 160). The microgrid should provide power to the loads, operate within voltage and frequency limits for each project, provide real and reactive support, and coordinate with protection systems. Within the normal operations, the microgrid should be capable of autonomous operation and scheduled operation. In a normal operating mode, the microgrid (e.g., microgrid 100) may use the following guidelines:

Battery (e.g., energy storage device 110) is the grid master, unless it is offline;
PV (e.g., EG system 130) supports load and charges battery during the day;
SoE values are configurable. E.g., SoE_min: 400 kWh;
Backup generation (e.g., diesel gen set generation) is dispatched when Battery SoE<SoE_min;
Backup generation is dispatched when demand approaches available generation capacity, PV generation+battery generation−reserve margin<load;
Backup generation is shut down when Battery SoE>SoE_min+margin (e.g., hysteresis band); and
PV is curtailed when PV generation exceeds the sum of the load and the energy storage system preferred charge value.

Exemplary Computer Systems Implementing
Embodiments Herein

Figure 12:
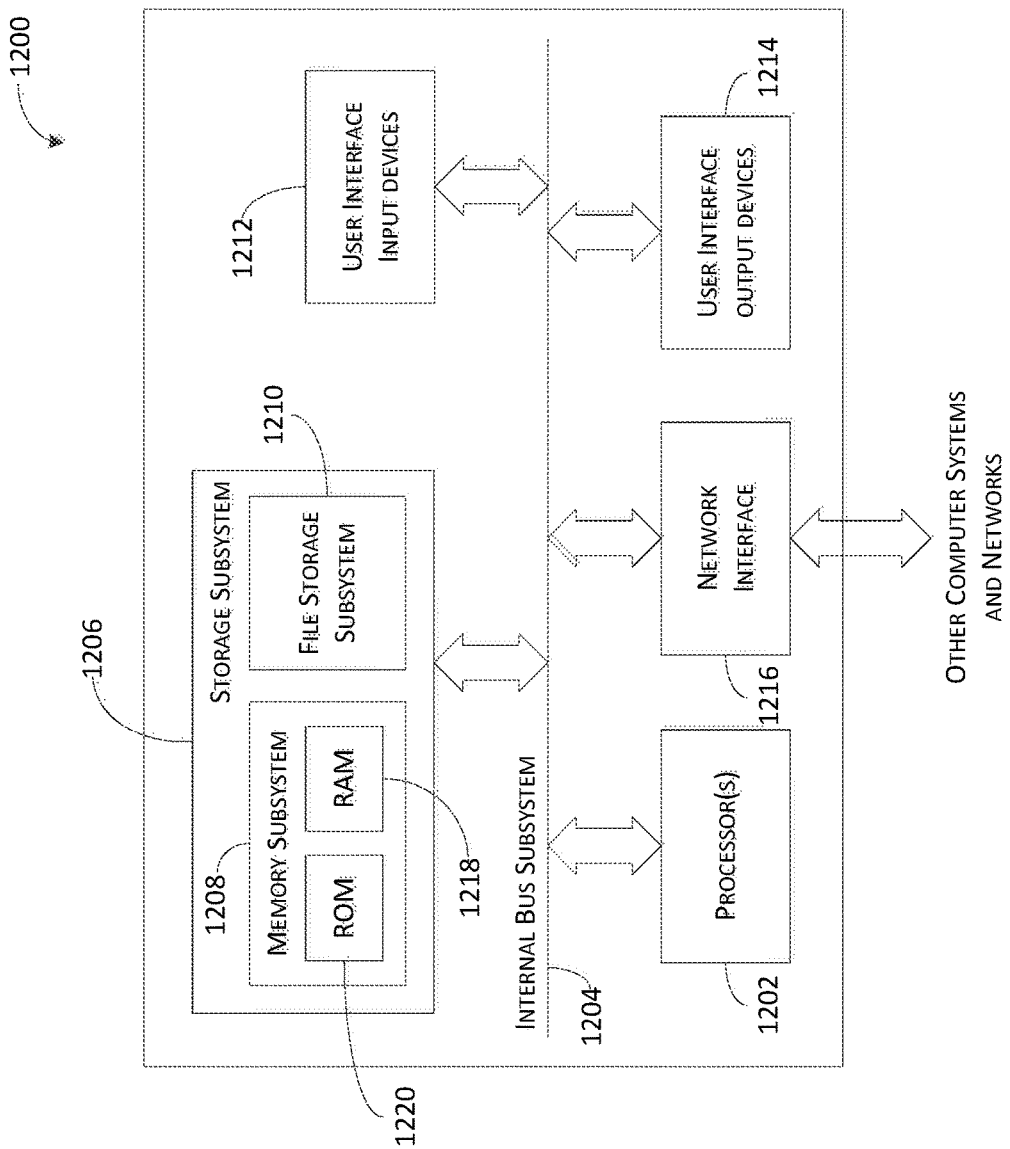
FIG. 12 shows a simplified block diagram of a computer system, according to certain embodiments.

FIG. 12 is a simplified block diagram of computer system 1200, according to certain embodiments. Computer system 1200 can be used to implement any of the computer systems/devices (e.g., controller 120, control server 228 and gateway devices 224) described with respect to FIGS. 1-2. As shown in FIG. 12, computer system 1200 can include one or more processors 1202 that communicate with a number of peripheral devices via a bus subsystem 1204. These peripheral devices can include storage subsystem 1206 (comprising memory subsystem 1208 and file storage subsystem 1210), user interface input devices 1212, user interface output devices 1214, and a network interface subsystem 1216.

In some examples, internal bus subsystem 1204 can provide a mechanism for letting the various components and subsystems of computer system 1200 communicate with each other as intended. Although internal bus subsystem 1204 is shown schematically as a single bus, alternative embodiments of the bus subsystem can utilize multiple buses. Additionally, network interface subsystem 1216 can serve as an interface for communicating data between computer system 1200 and other computer systems or networks. Embodiments of network interface subsystem 1216 can include wired interfaces (e.g., Ethernet, CAN, RS232, RS485, etc.) or wireless interfaces (e.g., ZigBee, Wi-Fi, cellular, etc.).

In some cases, user interface input devices 1212 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1200. Additionally, user interface output devices 1214 can include a display subsystem, a printer, or non-visual displays such as audio output devices, etc. The display subsystem can be any known type of display device. In general, use of the term "output device" is intended to include all possible types of devices and mechanisms for outputting information from computer system 1200.

Storage subsystem 1206 can include memory subsystem 1208 and file/disk storage subsystem 1210. Subsystems 1208 and 1210 represent non-transitory computer-readable storage media that can store program code and/or data that provide the functionality of embodiments of the present disclosure. In some embodiments, memory subsystem 1208 can include a number of memories including main random access memory (RAM) 1218 for storage of instructions and data during program execution and read-only memory (ROM) 1220 in which fixed instructions may be stored. File storage subsystem 1210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and not intended to limit embodiments of the present disclosure. Many other configurations having more or fewer components than system 1200 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A system for controlling an energy storage system state-of-energy within a microgrid comprising:
   a first energy generation (EG) system;
   an electrical load coupled to the first EG system, the electrical load having a load demand;
   an energy storage system coupled to the first EG system and the electrical load,
      wherein the energy storage system charges and discharges according to a target charge value and a target discharge value, and
      wherein the target charge value and target discharge value are based on a current state-of-energy of the energy storage system, wherein the current state-ofenergy is an energy storage capacity of the energy storage system as degraded over time;

wherein the target charge value is less than or equal to a current state-of-energy of the energy storage system, less a load drop margin, multiplied by an amount of time required to reduce an energy generation from the first EG system;

wherein the target discharge value is a portion of the current state-of-energy sufficient to serve the load demand for an amount of time required to bring online the first EG system or a second EG system; and a controller coupled to the first EG system and the energy storage system, the controller to control a power generation of the first EG system based on the load demand and the target charge value and target discharge value of the energy storage system.

2. The system of claim 1 wherein the controller further controls a power generation of the second EG system when the first EG system cannot meet the load demand and maintain the state-of-energy of the energy storage system within a desired level.

3. The system of claim 2 wherein the first EG system is a photo-voltaic-based EG system, and wherein the second EG system is a diesel generator system.

4. The system of claim 1 wherein the energy storage system operates in one of a plurality of functional states based on the state-of-energy of the energy storage system, wherein each functional state is assigned a target charge value and a target discharge value to maintain or return the state-of-energy of the energy storage system to a target range of values.

5. The system of claim 4 wherein the charging and discharging of the energy storage system, as defined by the charge value and discharge value of a current functional state of the energy storage system, is used to subsequently control the power generation of the first EG system.

6. The system of claim 4 wherein when the energy storage system is at or near a maximum state-of-energy, a corresponding functional state causes the first EG system to stop charging the energy storage system and the energy storage system to solely provision the electrical load.

7. The system claim 4 further comprising a second EG system, wherein the controller further controls a power generation of the second EG system when the first EG system cannot meet the load demand and maintain the state-of-energy of the energy storage system within a desired level, and wherein when the energy storage system is at or near a minimum state-of-energy, a corresponding functional state causes:

the energy storage system to stop provisioning the electrical load; and the second EG system to remain on to both meet the load demand and charge the energy storage system until a functional state with a higher corresponding state-of-energy is achieved.

8. The system of claim 7 wherein the charging and discharging of the energy storage system, as defined by the target charge value and target discharge value of a current functional state of the energy storage system, is used to subsequently control the power generation of the first EG system.

9. The system of claim 4 wherein at least one functional state of the plurality of functional states includes a hysteresis band level defining a reduced range of a state-of-energy for the at least one functional state for transitions from an adjacent functional state to the at least one functional state.

10. The system of claim 4 wherein the plurality of functional states comprises at least:

a too high state wherein the energy storage system is discharged;

a high state wherein the energy storage system is not charged;

a normal state wherein the energy storage system can be charged or discharged;

a low state wherein the energy storage system is only used to offset shortage or excess of energy generation from the first EG system or a second EG system; and a too low state where the energy storage system is charged.

11. A system for controlling a battery state-of-energy within a micro-grid, the system comprising:

a first energy generation (EG) system;

a battery system coupled to the first EG system, the battery system having a state-of-energy; and a controller coupled to the first EG system and the battery system, the controller configured to:

monitor a state-of-energy of the battery system;

set a target charge value and a target discharge value based on the state-of-energy for each of a plurality of functional states based on the state-of-energy of the battery system, wherein each functional state is assigned a different target charge value and a target discharge value to maintain or return the state-of-energy of the battery system to a target range of values; and control a power generation of the first EG system to meet a load demand on the system and attempt to control charging and discharging of the battery system within the target charge value and the target discharge value to adjust the state-of-energy to a desired range.

12. The system of claim 11 further comprising a second EG system, wherein the controller is further adapted to control a power generation of the second EG system when the first EG system cannot meet the load demand and maintain the state-of-energy of the battery system within the desired range.

13. The system of claim 12 wherein the first EG system is a photo-voltaic-based EG system, and wherein the second EG system is a diesel gen set system.

14. The system of claim 12 wherein when the battery system is at or near a maximum state-of-energy, a corresponding functional state causes the first EG system to stop charging the battery system and the battery system to solely provision an electrical load.

15. The system of claim 12 further comprising a second EG system, wherein the controller further controls a power generation of the second EG system when the first EG system cannot meet the load demand and maintain the state-of-energy of the battery system within a desired level, and wherein when the battery system is at or near a minimum state-of-energy, a corresponding functional state causes:

the battery system to stop provisioning an electrical load; and the second EG system to remain on to both meet the load demand and charge the battery system until a functional state with a higher corresponding state-of-energy is achieved.

16. The system of claim 11 wherein the target charge value and the target discharge value are set based on the state-of-energy being within one of a plurality of band levels.

17. The system of claim 1 wherein the energy storage system operates in one of a plurality of functional states based on the state-of-energy of the energy storage system, wherein each functional state is assigned a target charge value and target discharge value to maintain or return the state-of-energy of the energy storage system to a target value.

18. A method comprising:
receiving, by a processor, state-of-energy data from a battery system coupled to a first energy generation (EG) system and an electrical load;
determining, by the processor, which operational state of a plurality of operational states the battery system is operating in based on the state-of-energy data;
determining, by the processor, a preferred target charge value and target discharge value of a functional state; and
controlling, by the processor, a power generation of the first EG system based on a load demand of the electrical load and the preferred charge and discharge values of the functional state.

19. The method of claim 18 further comprising:
controlling, by the processor, a power generation of a second EG system based on the load demand of the electrical load and the state-of-energy data of the battery system, wherein the second EG system is coupled to the battery system and the electrical load.

20. The method of claim 19 wherein the first EG system is a photovoltaic-based energy generation system, and wherein the second EG system is a diesel gen set system.

21. The method of claim 18 wherein the charging and discharging of the battery system, as defined by the charge value and discharge value of a determined functional state of the battery system, is used to subsequently control the power generation of the first EG system.

* * * * *